(12) United States Patent
Albero et al.

(10) Patent No.: US 12,737,664 B2
(45) Date of Patent: Sep. 15, 2026

(54) INTELLIGENT METHOD FOR QUANTUM ENABLED ERROR IDENTIFICATION WITH DIFFERENTIAL PRIVACY

(71) Applicant: Bank of America Corporation, Charlotte, NC (US)

(72) Inventors: George Albero, Charlotte, NC (US); Naga Vamsi Krishna Akkapeddi, Charlotte, NC (US); Sakshi Bakshi, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 92 days.

(21) Appl. No.: 18/807,146

(22) Filed: Aug. 16, 2024

(65) Prior Publication Data

US 2026/0050816 A1 Feb. 19, 2026

(51) Int. Cl.
*G06F 21/62* (2013.01)
*G06N 10/70* (2022.01)

(52) U.S. Cl.
CPC ......... *G06N 10/70* (2022.01); *G06F 21/6245* (2013.01); *G06F 21/6254* (2013.01); *G06F 21/6263* (2013.01); *G06F 21/6281* (2013.01); *G06F 21/629* (2013.01)

(58) Field of Classification Search
CPC .. G06F 21/6245; G06F 21/602; G06F 21/604; G06N 10/70
See application file for complete search history.

(56) References Cited

U.S. PATENT DOCUMENTS 9,734,169 B2 8/2017 Redlich et al.
9,755,826 B2 9/2017 Tanizawa
9,922,345 B2 3/2018 Mikurak
10,043,035 B2 8/2018 LaFever et al.
10,223,547 B2 3/2019 Rane et al.
10,360,096 B2 7/2019 Morris et al.
10,572,684 B2 2/2020 LaFever et al.
10,802,910 B2 10/2020 Deutsch et al.
11,003,568 B2 5/2021 Smith et al.
11,068,619 B2 7/2021 Canard et al.
11,087,025 B2 * 8/2021 Santana de Oliveira .................... G06N 3/02
11,153,032 B2 10/2021 Das Sharma
11,238,167 B2 * 2/2022 Boehler ................ H04L 9/0894
11,444,636 B2 9/2022 Lucarelli
11,470,245 B2 10/2022 Dewhurst et al.
(Continued)

*Primary Examiner* — Jonathan D Gibson
(74) *Attorney, Agent, or Firm* — Banner & Witcoff, Ltd.

(57) ABSTRACT

Arrangements for quantum enabled error identification are provided. A computing platform may train an artificial intelligence (AI) engine. The computing platform may extract metadata from one or more interconnected systems. The computing platform may use the metadata to map connections within the one or more interconnected systems. The computing platform may generate one or more dynamic markers. The computing platform may convert the metadata into qubits. The computing platform may generate one or more quantum enabled differential privacy components. The computing platform may inject the components into the one or more interconnected systems. A dynamic marker may be highlighted. An error may be identified based on the dynamic marker that was highlighted. An action may be identified based on the error. The action may be automatically executed by the computing platform.

19 Claims, 10 Drawing Sheets

(56) References Cited

U.S. PATENT DOCUMENTS

| | | | | |
|---|---|---|---|---|
| 11,748,649 | B2 | 9/2023 | Zou et al. | |
| 12,001,965 | B2 | 6/2024 | Callcut et al. | |
| 12,021,972 | B2 * | 6/2024 | Wang | G06F 21/608 |
| 12,124,611 | B2 * | 10/2024 | Daub | G06F 16/2255 |
| 12,524,555 | B2 * | 1/2026 | Lang | G06F 21/602 |
| 2017/0279540 | A1 * | 9/2017 | Tanizawa | H04B 10/70 |
| 2019/0013950 | A1 * | 1/2019 | Becker | H04L 9/0618 |
| 2019/0272388 | A1 * | 9/2019 | Tsou | G06F 21/6254 |
| 2020/0358599 | A1 * | 11/2020 | Baracaldo Angel | H04L 9/085 |
| 2021/0133590 | A1 | 5/2021 | Amroabadi et al. | |
| 2021/0149763 | A1 | 5/2021 | Ranganathan et al. | |
| 2022/0138532 | A1 * | 5/2022 | Dalli | G06N 3/092<br>706/27 |
| 2022/0277097 | A1 | 9/2022 | Cabot et al. | |
| 2023/0245651 | A1 | 8/2023 | Wang | |
| 2024/0249018 | A1 * | 7/2024 | Rawat | G06F 21/6245 |
| 2025/0131116 | A1 * | 4/2025 | Han | G06F 21/60 |
| 2025/0258937 | A1 * | 8/2025 | Crabtree | G06N 5/02 |
| 2025/0259085 | A1 * | 8/2025 | Crabtree | G06N 5/043 |
| 2025/0363245 | A1 * | 11/2025 | Sohum | G06F 21/6263 |
| 2025/0371172 | A1 * | 12/2025 | Lang | G06F 21/602 |
| 2026/0050816 | A1 * | 2/2026 | Albero | G06F 21/6245 |

* cited by examiner

INTELLIGENT METHOD FOR QUANTUM ENABLED ERROR IDENTIFICATION WITH DIFFERENTIAL PRIVACY

BACKGROUND

Aspects of the disclosure relate to the identification of issues (e.g., errors) within one or more interconnected systems. Currently, the identification and/or resolution of errors within the one or more interconnected systems may be time consuming to perform and further consume computing resources. Accordingly, it may be advantageous to identify more effective and efficient methods to identify and resolve such errors.

SUMMARY

Aspects of the disclosure provide effective, efficient, scalable, and convenient solutions that address and overcome the technical problems associated with the identification and resolution of errors within one or more interconnected systems. In accordance with one or more aspects of the disclosure, a computing platform with at least one processor, a communication interface communicatively coupled to the at least one processor, and memory storing computer-readable instructions may train, based on historical information, an artificial intelligence (AI) engine, in which training the AI engine may configure the AI engine to identify an action to resolve an error. The computing platform may extract metadata from one or more interconnected enterprise processing systems. The computing platform may use the metadata to map the one or more interconnected enterprise processing systems, in which the mapping may identify one or more connections within the one or more interconnected enterprise processing systems between one or more of the one or more interconnected enterprise processing systems or applications within the one or more interconnected enterprise processing systems. The computing platform may generate one or more dynamic markers. The computing platform may create a pair of quantum entangled differential privacy components for each of the one or more dynamic markers. The computing platform may store a first of the pair of quantum differential privacy components at the computing platform. The computing platform may inject a second of the pair of quantum entangled differential privacy components into the metadata of the one or more interconnected enterprise processing systems. The computing platform may detect that a dynamic marker has been activated, in which the dynamic marker is activated by activating, at one of the one or more interconnected enterprise processing systems, the second of the pair of quantum entangled differential privacy components that corresponds to the dynamic marker, and further activating, at the computing platform and based on the activating of the second of the pair of quantum entangled differential privacy components, the first of the pair of quantum entangled differential privacy components, in which the first of the pair of quantum entangled differential privacy components and the second of the pair of quantum entangled differential privacy components may correspond to the dynamic marker that was activated, and in which the activating of the first of the pair of quantum entangled differential privacy components may be based on the activating of the second of the pair of quantum entangled differential privacy components. The computing platform may identify an error that corresponds to the dynamic marker that was activated. The computing platform may identify an action based on the error using the AI engine. The computing platform may execute the action by sending commands to the one or more interconnected processing systems that may direct one of the one or more interconnected processing systems to execute the action.

In one or more examples, the computing platform may generate a report, in which the report may include the error that corresponds to the dynamic marker that was activated, and the action that was executed. In some instances, the computing platform may send, to an enterprise user device, the report and one or more commands directing the enterprise user device to display the report, which may cause the enterprise user device to display the report.

In one or more examples, the computing platform may create one or more blueprints, in which each of the one or more blueprints may correspond to one or more transactions within the one or more interconnected enterprise processing systems. In some instances, the historical information may further include historical errors, historical actions that resolved corresponding historical errors, historical dynamic markers, and historical transactions.

In one or more examples, the one or more dynamic markers may further include one or more of a transaction marker, an application marker, a system marker, a network marker, a hardware marker, or a software marker. In some instances, the pair of quantum entangled differential privacy components may be created using a laplace transformation. In one or more examples, the creating may be performed using differential privacy.

In some instances, the computing platform may update, using a dynamic feedback loop and based on the detecting, the identifying, and the executing, the AI engine. In one or more examples, the identifying the error that corresponds to the dynamic marker that was activated comprises automatically identifying the error using the AI engine.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
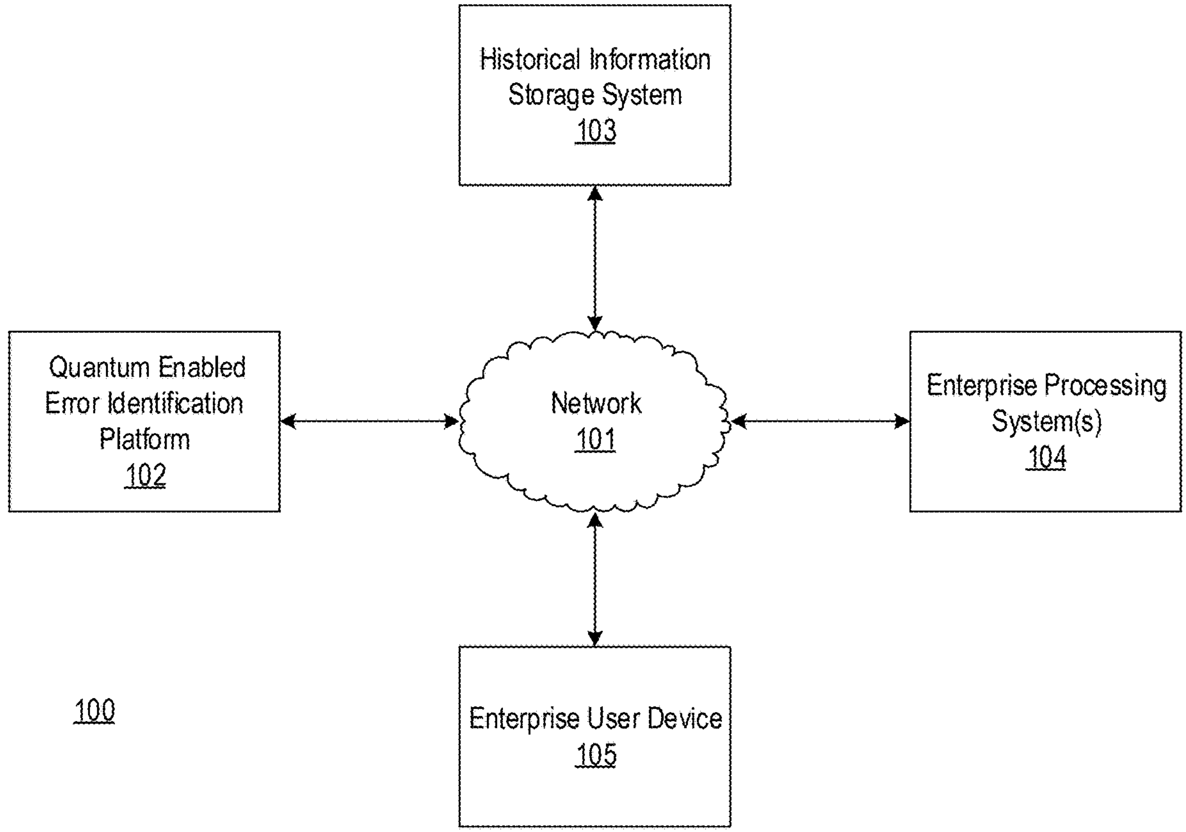
FIGS. 1A-1B depict an illustrative computing environment for implementing an intelligent method for quantum enabled error identification in accordance with one or more aspects described herein.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to the identification and resolution of errors within one or more interconnected systems using quantum enabled differential privacy. In some instances, transactions may need to pass through one or more applications from origin to posting. In some instances, there may be occasions in which one of the applications corrupts data associated with a transaction. Current efforts that may be used to identify which of the applications corrupted the data may be time intensive and consume a great deal of resources, and further may lead to more errors.

Accordingly, described herein is a system that may use quantum entangled differential privacy and corresponding noise components in the transaction path, which may help create a blueprint of the transaction. In some instances, the system may use highlighters and/or markers to detect the transaction information in question.

Accordingly, as transactions pass through applications from origin to posting, applications may log the metadata of the transaction along with transaction information at every hop. The metadata may be fed to dynamic markers which may evaluate the markers and extract connection information. These connectors may be used to identify the transaction path for each application. A metadata artificial intelligence (AI) transformer may receive the metadata lineage based on the transaction path and may further introduce quantum entangled differential privacy based noise components in the flow. In some instances, the AI transformer may include a bidirectional encoder representations from transformers (BERT) model. The noise-based component may work as a non-altering agent to map the flow of the transaction without affecting the transaction. The differential privacy may use laplace transformation to generate the noise components without impacting the output of the system.

Accordingly, a centralized artificial intelligence (AI) engine may create a blueprint of the transaction flow without altering the path of the transaction. The blueprint may contain the process flow that may give the overall lineage of the transaction. In some instances, highlighters and markers may be used to provide transaction data location, which may be inactive until being activated through the quantum entangled differential privacy laplace components. If there is a change in the transaction flow, the AI engine may use the quantum laplace components to identify the updated flow and mark the earlier flow as inactive.

Figure 1B:
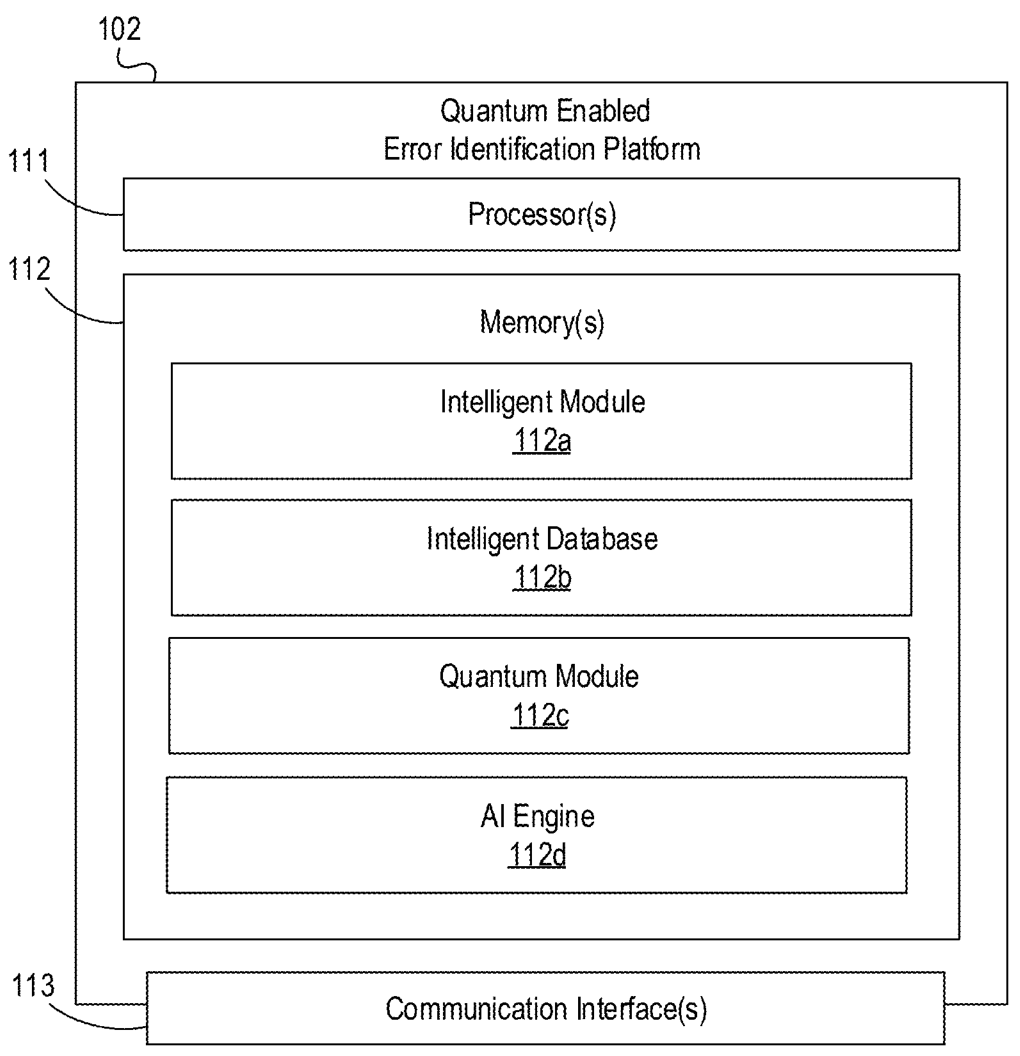

FIGS. 1A-1B depict an illustrative computing environment for implementing an intelligent method for quantum enabled error identification in accordance with one or more aspects described herein. Referring to FIG. 1A, computing environment 100 may include one or more computer systems. For example, computing environment 100 may include quantum enabled error identification platform 102, historical information storage system 103, enterprise processing system(s) 104, and enterprise user device 105.

As described further below, quantum enabled error identification platform 102 may be a computer system that includes one or more computing devices (e.g., servers, server blades, or the like) and/or other computer components (e.g., processors, memories, communication interfaces) that may be used to train, host, and/or otherwise refine an artificial intelligence (AI) engine, which may be used to identify and/or resolve errors related to transactions that may be processed within enterprise processing system(s) 104, as discussed in more detail below.

Historical information storage system 103 may include one or more computing devices and/or other computer components (e.g., processors, memories, communication interfaces). In some instances, historical information storage system 103 may include one or more data sources that may store historical information, which may be used to train an AI engine to identify an action to resolve an error associated with a transaction that is processed within enterprise processing system(s) 104. In some instances, historical information storage system 103 may be configured as a cloud storage system, in which historical information storage system 103 may include a cloud computing model that stores data on the Internet through a cloud computing provider who manages and operates historical information storage system 103 as a service. In some instances, historical information system 103 may be local or non-cloud based storage, or may support cloud based storage.

Enterprise processing system(s) 104 may be a computer system that includes one or more computing devices (e.g., servers, server blades, or the like) and/or other computer components (e.g., processors, memories, communication interfaces) that may be used to process one or more requests (e.g., transactions or the like). In some instances, enterprise processing system(s) 104 may represent one or more interconnected systems that represent, e.g., one or more enterprise systems (e.g., systems of a corporation, financial institution, educational institution, governmental institution, or the like). In some instances, each enterprise processing system within enterprise processing system(s) 104 may include one or more applications that a transaction may pass through, representing, for example, the origination to posting of the transaction (e.g., posting a transaction associated with a customer account that the customer recently engaged in). Additionally, this may refer to a transaction originating at an application within one of enterprise processing system(s) 104, which may subsequently pass through additional applications with that particular enterprise processing system, which may subsequently pass through to a different enterprise processing system of enterprise processing system(s) 104, which itself may include one or more applications that the transaction may subsequently pass through before being posted.

In some instances, each of enterprise processing system(s) 104 may be managed by a different entity (e.g., corporation, financial institution, educational institution, governmental institution, or the like). Each different entity may use different standards/protocols for transactions that are processed within that system. As such, when transactions move from one enterprise processing system to another enterprise processing system of enterprise processing system(s) 104, the transaction itself may change (e.g., change in format, protocol used to transmit, etc), which may introduce errors. Further, an error could occur within an application, and then pass to a different system's application, which may subsequently log the error. The identification may become difficult to identify as the transaction continues to move within enterprise processing system(s) 104 because the error might not be identified until the transaction if finally posted.

Enterprise user device 105 may be a laptop computer, desktop computer, mobile device, tablet, smartphone, and/or other device, which may receive a report related to an action that was executed to resolve an identified error. In some instances, enterprise user device 105 may be a user computing device that is used by an individual (e.g., a developer). In some instances, enterprise user device 105 may be an enterprise computing device that is used by an administrator. In some instances, enterprise user device 105 may be configured to display one or more user interfaces (e.g., interfaces depicting a notification that an error has been identified and an action has been executed to resolve the error, or the like). Although only a single enterprise user device 105 is depicted, this is for illustrative purposes only, and any number of user devices may be implemented in the environment 100 without departing from the scope of the disclosure.

Computing environment 100 also may include one or more networks (e.g., Local Area Networks (LANs), Wide Area Networks (WANs), or the like), which may interconnect quantum enabled error identification platform 102, historical information storage system 103, enterprise processing system(s) 104, and enterprise user device 105. For example, computing environment 100 may include a network 101 (which may interconnect, e.g., quantum enabled error identification platform 102, historical information storage system 103, enterprise processing system(s) 104, and enterprise user device 105, and/or other computing devices).

In one or more arrangements, quantum enabled error identification platform 102, historical information storage system 103, enterprise processing system(s) 104, and/or enterprise user device 105 may be any type of computing device capable of sending and/or receiving requests and processing the requests accordingly. For example, quantum enabled error identification platform 102, historical information storage system 103, enterprise processing system(s) 104, and enterprise user device 105, and/or the other systems included in computing environment 100 may, in some instances, be and/or include servers, such as an enterprise server, server computers, desktop computers, laptop computers, tablet computers, smart phones, or the like that may include one or more processors, memories, communication interfaces, storage devices, and/or other components. As noted above, and as illustrated in greater detail below, any and/or all of quantum enabled error identification platform 102, historical information storage system 103, enterprise processing system(s) 104, and enterprise user device 105 may, in some instances, be special-purpose computing devices configured to perform specific functions.

Referring to FIG. 1B, quantum enabled error identification platform 102 may include one or more processors 111, memory 112, and communication interface 113. A data bus may interconnect processor 111, memory 112, and communication interface 113. Communication interface 113 may be a network interface configured to support communication between quantum enabled error identification platform 102 and one or more networks (e.g., network 101, or the like). Memory 112 may include one or more program modules having instructions that when executed by processor 111 cause quantum enabled error identification platform 102 to perform one or more functions described herein and/or one or more databases that may store and/or otherwise maintain information which may be used by such program modules and/or processor 111. In some instances, the one or more program modules and/or databases may be stored by and/or maintained in different memory units of quantum enabled error identification platform 102 and/or by different computing devices that may form and/or otherwise make up quantum enabled error identification platform 102. For example, memory 112 may have, host, store, and/or include intelligent module 112*a*, intelligent database 112*b*, quantum module 112*c*, and/or artificial intelligence (AI) engine 112*d*.

Intelligent module 112*a* may have instructions that direct and/or cause quantum enabled error identification platform 102 to process and/or execute instructions to identify an error associated with a transaction that is processed within enterprise processing system(s) 104, and/or perform other functions, as discussed in greater detail below. Intelligent database 112*b* may store information used by intelligent module 112*a* and/or quantum enabled error identification platform 102 and/or in performing other functions. Quantum module 112*c* may be used by quantum enabled error identification platform 102 and/or intelligent module 112*a* to convert metadata associated with enterprise processing system(s) 104 and/or a transaction within enterprise processing system(s) 104 into quantum information (e.g., qubits), create quantum enabled differential privacy noise component pairs, and/or perform other methods described herein. AI engine 112*d* may be used by quantum enabled error identification platform 102 and/or intelligent module 112*a* to identify an action to execute based on an identified error related to a transaction failure within enterprise processing system(s) 104, and/or perform other methods described herein.

Figure 2A:
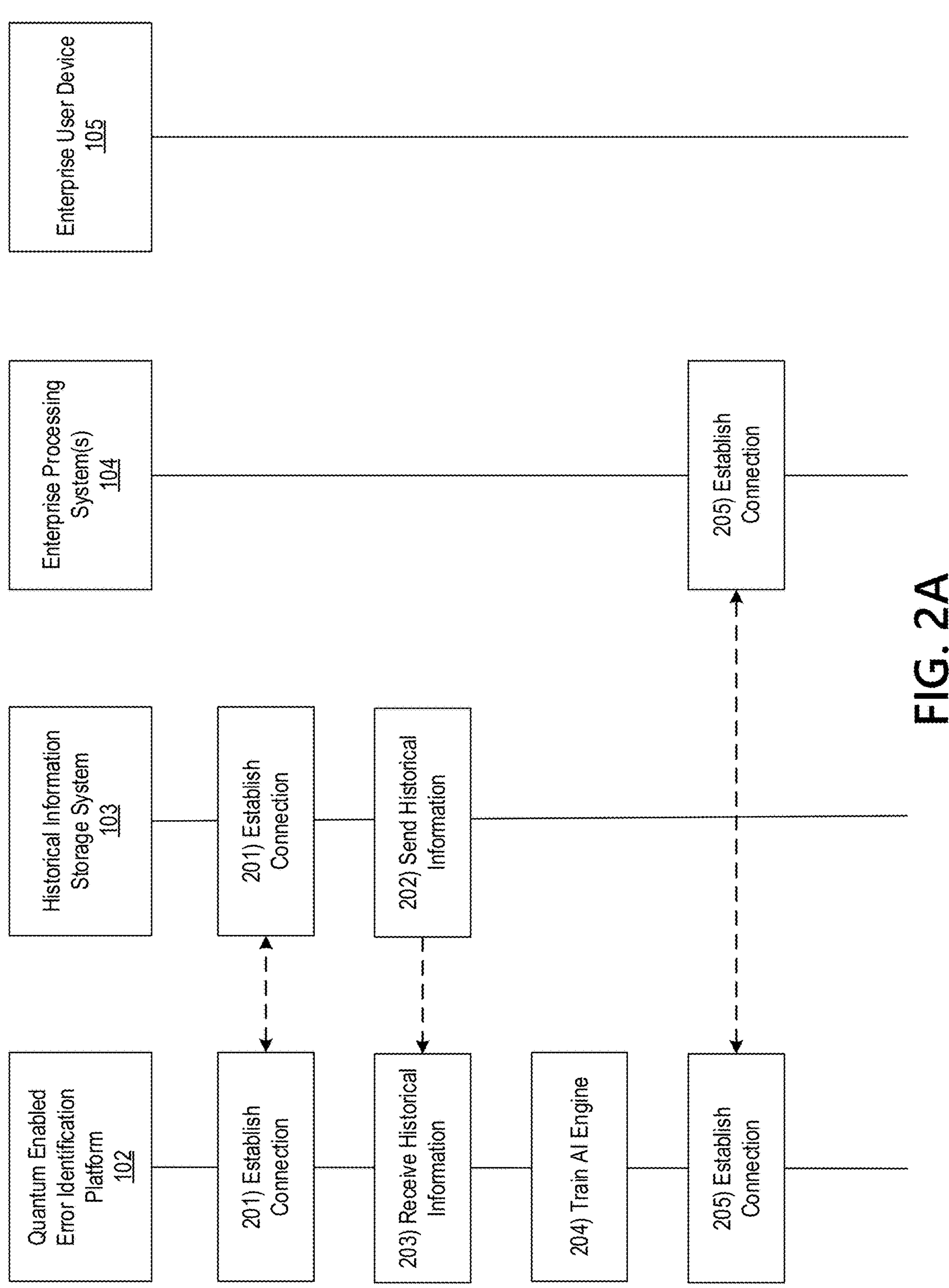
FIGS. 2A-2F depict an illustrative event sequence for implementing an intelligent method for quantum enabled error identification in accordance with one or more aspects described herein.

FIGS. 2A-2F depict an illustrative event sequence for implementing an intelligent method for quantum enabled error identification in accordance with one or more aspects described herein. Referring to FIG. 2A, at step 201, historical information storage system 103 may establish a connection with quantum enabled error identification platform 102. For example, historical information storage system 103 may establish a first wireless data connection with quantum enabled error identification platform 102 to link historical information storage system 103 to quantum enabled error identification platform 102 (e.g., in preparation for sending historical information to train an AI engine, and/or performing other functions). In some instances, historical information storage system 103 may identify whether or not a connection is established with quantum enabled error identification platform 102. If a connection is already established with quantum enabled error identification platform 102, historical information storage system 103 might not re-establish the connection. If a connection is not yet established quantum enabled error identification platform 102, historical information storage system 103 may establish the first wireless data connection as described herein.

At step 202, historical information storage system 103 may send historical information to quantum enabled error identification platform 102. For example, historical information storage system 103 may send the historical information to quantum enabled error identification platform 102 while the first wireless data connection is established.

At step 203, quantum enabled error identification platform 102 may receive the historical information. For example, quantum enabled error identification platform 102 may receive the historical information while the first wireless data connection is established and via communication interface(s) 113. In receiving the historical information, quantum enabled error identification platform 102 may receive information such as historical errors, historical actions that resolved the historical errors, historical dynamic markers, historical transactions, historical information related to enterprise processing system(s) 104, and/or other types of information.

In some instances, historical errors may include transaction errors, application errors, system errors, network errors, security errors, hardware errors, software errors, and/or similar errors. For example, a historical error may be a transaction error, which may refer to an error in which the cause of the error may be due to the transaction (e.g., corrupted data within the transaction). Additionally or alternatively, a historical error may be an application error, which may refer to an error in which the cause of the error may be due to an application failure (e.g., the application is an old version that needs to be updated to a current version, which may cause a transaction to fail).

Additionally or alternatively, a historical error may be a system error, which may refer to an error in which the cause of the error may be due to a system failure (e.g., a system crash while the transaction is being processed). Additionally or alternatively, a historical error may be a network error, which may refer to an error in which the cause of the error may be due to a network failure (e.g., a domain name system (DNS) lookup failure). Additionally or alternatively, a historical error may be a security error, which may refer to an error in which the cause of the error is due to a security failure (e.g., an outdated security protocol).

Additionally or alternatively, a historical error may be a software error, which may refer to an error in which the cause of the error is due to a software failure (e.g., a software bug). Additionally or alternatively, a historical error may be a hardware error, which may refer to an error in which the cause of the error is due to a hardware failure (e.g., a hard drive issue).

In some instances, a historical action may be a previously executed action that was used to resolve a historical error. For example, if the historical error was an application failure, and the historical action that resolved the application failure was performing an application update, then that historical error and historical action may be correlated to each other for future errors similar to that historical error. For example, additional historical actions may be alerting a software team about a software bug, alerting a hardware vendor associated with a hardware issue, rebooting a network associated with a network failure, alerting a security team about a security failure, etc. In this manner, historical information may be used to train the AI engine to correlate historical errors and historical actions so that when future errors occur, the trained AI engine may correlate the error to a similar historical error, which may then be used to identify a historical action that can be executed to resolve the error, as discussed in more detail below.

At step 204, quantum enabled error identification platform 102 may train an artificial intelligence (AI) engine (e.g., AI engine 112*d*) based on the historical information. For example, in training the AI engine, quantum enabled error identification platform 102 may configure the AI engine to identify an action to execute based on an error. As an example, if the error is a network failure, quantum enabled error identification platform 102 may train the AI engine to identify a historical error that is the same/similar to the current error (i.e., the network failure). Then, quantum enabled error identification platform 102 may train the AI engine to identify a historical action that was used to resolve the historical error, and then use that historical error to resolve the current error (i.e., the network failure).

In some instances, the AI engine may utilize supervised learning, in which labeled data sets may be inputted into the AI engine (e.g., historical actions that correspond to historical errors, and the like), which may be used to classify information and accurately predict outcomes with respect to identifying an action to resolve an error. Using labeled inputs and outputs, the AI engine may measure its accuracy and learn over time. For example, supervised learning techniques such as linear regression, classification, neural networking, and/or other supervised learning techniques may be used.

Additionally or alternatively, the AI engine may utilize unsupervised learning, in which unlabeled data may be input into the AI engine. For example, unsupervised learning techniques such as k-means, gaussian mixture models, frequent pattern growth, and/or other unsupervised learning techniques may be used. In some instances, the AI engine may be a combination of supervised and unsupervised learning. In doing so, quantum enabled error identification platform 102 may dynamically and continuously update and/or otherwise refine the AI engine so as to increase accuracy of the AI engine over time.

At step 205, quantum enabled error identification platform 102 may establish a connection with 104. For example, quantum enabled error identification platform 102 may establish a second wireless data connection with enterprise processing system(s) 104 to link quantum enabled error identification platform 102 to enterprise processing system(s) 104 (e.g., in preparation for extracting metadata from enterprise processing system(s) 104, and/or performing other functions). In some instances, quantum enabled error identification platform 102 may identify whether or not a connection is established with enterprise processing system(s) 104. If a connection is already established with enterprise processing system(s) 104, quantum enabled error identification platform 102 might not re-establish the connection. If a connection is not yet established with enterprise processing system(s) 104, quantum enabled error identification platform 102 may establish the second wireless data connection as described herein.

Figure 2B:
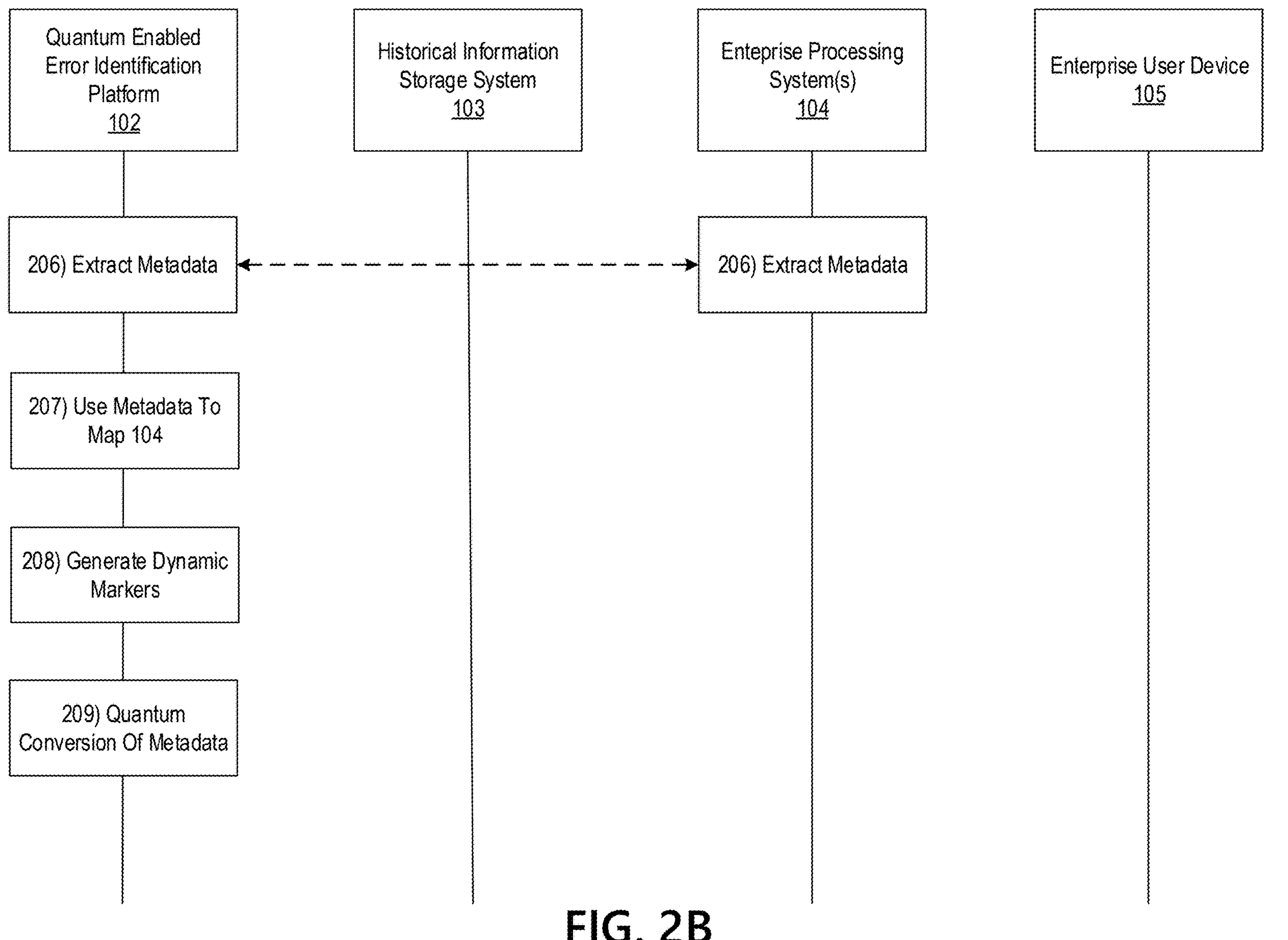

Referring to FIG. 2B, at step 206, quantum enabled error identification platform 102 may extract metadata from enterprise processing system(s) 104. For example, quantum enabled error identification platform 102 may extract the metadata from event processing system(s) 104 using the second wireless data connection and via communication interface(s) 113. For example, the metadata may include information related to event processing system(s) 104, such as information related to each event processing system of event processing system(s) 104, applications within each event processing system of event processing system(s) 104, transactions being processed within event processing system(s) 104, and/or similar information.

In this manner, quantum enabled error identification platform 102 may extract information related to the architecture and/or operation/functioning of enterprise processing system(s) 104 without directly accessing sensitive and/or private information stored at event processing system(s) 104. For example, if one of the systems of enterprise processing system 104 is a financial institution that contains private information such as information related to a customer (e.g., a name, date of birth, financial record, or the like), the extracting performed at step 204 might not access that private information. The metadata extracted as part of step 206 may be used to map event processing system(s) 104, as discussed in more detail with respect to step 207.

At step 207, quantum enabled error identification platform 102 may use the metadata that was extracted at step 206 to map event processing system(s) 104. In mapping event processing system(s) 104, quantum enabled error identification platform 102 may map the architecture and/or operation/functioning of event processing system(s) 104, such as the upstreams/downstreams of enterprise processing system(s) 104, and/or how transactions move within event processing system(s) 104 from origination to posting. For example, quantum enabled error identification platform 102 may map one or more connections between each event processing system of event processing system(s) 104. As another example, quantum enabled error identification platform 102 may map one or more connections between one or more applications with each event processing system of event processing system(s) 104. As another example, quantum enabled error identification platform 102 may identify a network or networks used within event processing system(s) 104. As another example, quantum enabled error identification platform 102 may map how transactions flow within event processing system(s) 104.

At step 208, quantum enabled error identification platform 102 may generate one or more dynamic markers. For example, a dynamic marker may be based on a transaction or transaction type. There may be different transaction types based on whether the transaction is a private transaction, public transaction, financial transaction, business transaction, consumer transaction, etc. As another example, a dynamic marker may be based on a specific application with any enterprise processing system within enterprise processing system(s) 104. As another example, a dynamic marker may be created for each enterprise processing system of enterprise processing system(s) 104. In some instances, there may be hardware, software, network markers, and/or other types of dynamic markers without departing from the scope of the disclosure. In some instances, dynamic markers may be created using a manual process performed by, for example, enterprise user device 105. In some instances, dynamic marker may be created by using AI engine 112*d*.

At step 209, quantum enabled error identification platform 102 may convert the metadata that was extracted at step 206 into quantum information. For example, the quantum conversion may be performed by quantum module 112*c*. For example, quantum module 112*c* may contain a quantum converter that converts information (e.g., metadata) into qubits. In converting the metadata into qubits, quantum enabled error identification platform 102 may realize the technical benefits of holding information in parallel, which may lead to a greater ability of quantum enabled error identification platform 102 to process information related to the identification and/or resolution of errors with enterprise processing system(s) 104.

Figure 2C:
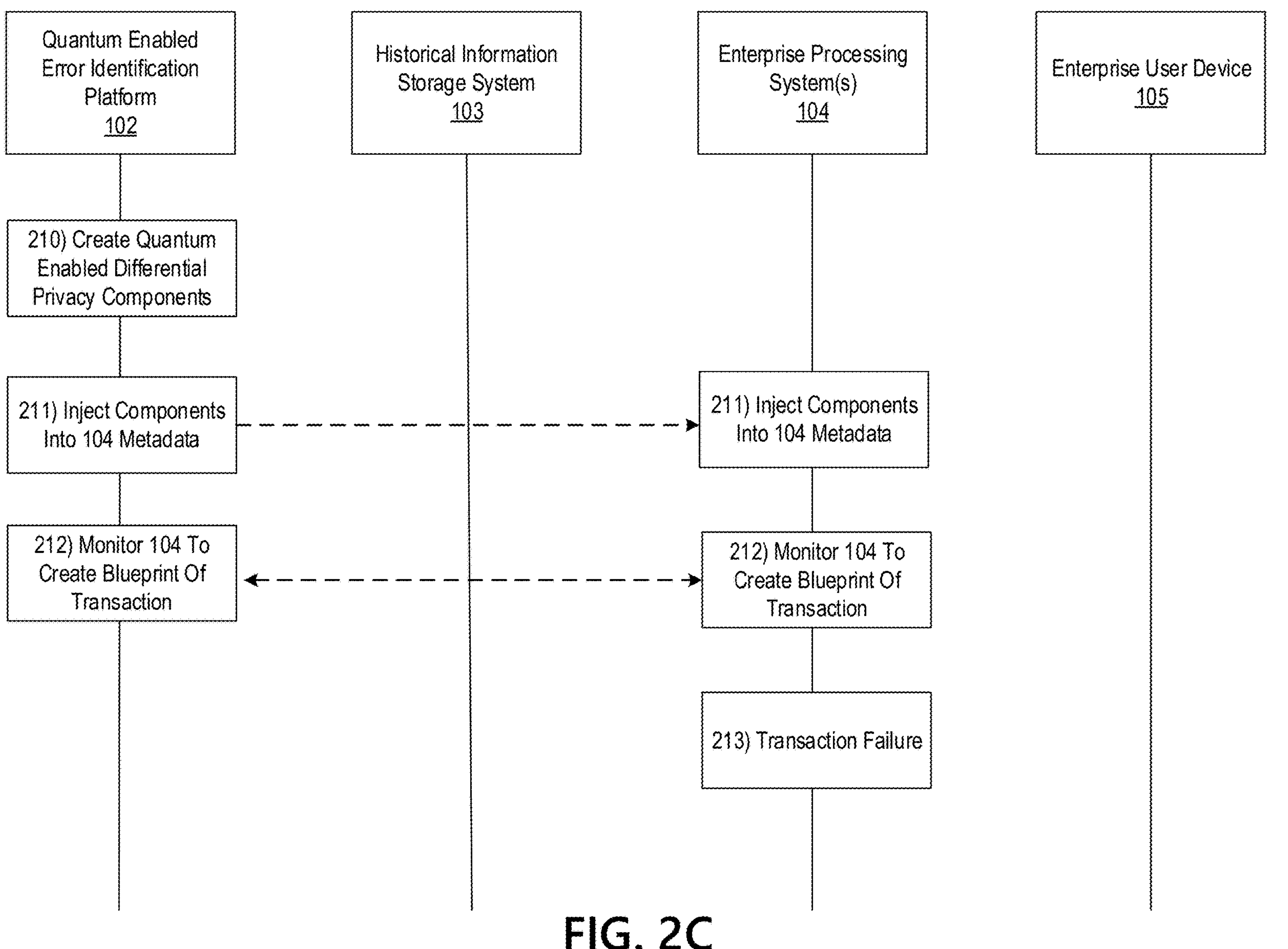

Referring to FIG. 2C, at step 210, quantum enabled error identification platform 102 may create one or more pairs of quantum enabled differential privacy components that correspond to the dynamic markers that were generated in step 208. For example, each dynamic marker that was generated in step 208 may be inputted into quantum module 112*c*. Then, each dynamic maker may be converted into a pair of quantum enabled differential privacy components. Further, each of the pair of quantum enabled differential privacy components may be related to each other via quantum entanglement, meaning that an effect on one of the pair of quantum enabled differential privacy components may affect the other of the pair of quantum enabled differential privacy components, even if the pair of quantum enabled differential privacy components are separated from each other.

In some instances, quantum module 112*c* may create the one or more pairs of quantum enabled differential privacy components using a quantum noise inducer. For example, differential privacy, laplace transform, and/or other similar methods may be used to create the one or more pairs of quantum enabled differential privacy components.

At step 211, quantum enabled error identification platform 102 may inject one of the pair of quantum enabled differential privacy components into the metadata within event processing system(s) 104. For example, quantum enabled error identification platform 102 may inject one of the pair of quantum enabled differential privacy components that corresponds to a dynamic marker into the metadata of enterprise processing system(s) 104 using the second wireless data connection.

By using differential privacy, the one of the pair of quantum enabled differential privacy components may appear as noise within the metadata of enterprise processing system(s) 104, which may realize the benefit of acting as a non-altering agent within enterprise processing system(s) 104, until a failure associated with a transaction in enterprise processing system(s) 104 activates/highlights the one of the pair of quantum enabled differential privacy components that was injected as part of step 211. In some instances, quantum enabled error identification platform 102 may store the second of the pair of the quantum enabled differential privacy component at quantum module 112*c*.

For example, the one of the pair of quantum enabled differential privacy components that was injected into the metadata of enterprise processing system(s) 104 may be configured to activate/highlight when an error arises due to a transaction (although not necessarily caused by the transaction itself—the error may be due to an application, system, network failure or other failures without departing from the scope of the disclosure). Then, because of quantum entanglement, the second of the pair that was stored at quantum module 112*c* may also get activated in response to the first of the pair that was injected into enterprise processing system(s) 104 being activated, as discussed in more detail with respect to steps 214 and 215.

At step 212, quantum enabled error identification platform 102 may monitor event processing system(s) 104 to create a blueprint associated with a transaction within event processing system(s) 104. For example, any time a transaction originates at any enterprise processing system of enterprise processing system(s) 104, quantum enabled error identification platform 102, as part of the monitoring performed in step 212, may identify the newly originated transaction and trace/track the transaction as the transaction moves from origination to posting throughout enterprise processing system(s) 104 by creating a blueprint of the transaction as it moves throughout enterprise processing system(s) 104 until being posted. In some instances, the blueprint may be updated as a transaction movies from origination to posting. Additionally or alternatively, the blueprint may be marked as inactive in response to a transaction failure corresponding to the blueprint without departing from the scope of the disclosure.

At step 213, a transaction failure may occur within event processing system(s) 104. For example, a transaction failure may be transaction-based, application-based, system-based, network-based, hardware-based, software-based, etc. Based on the type of failure that occurred, the one of the pair of quantum enabled differential privacy components that was previously injected at step 211 (which corresponds to the particular dynamic marker, e.g., the network marker) may be activated, as discussed in more detail with respect to step 215.

Figure 2D:
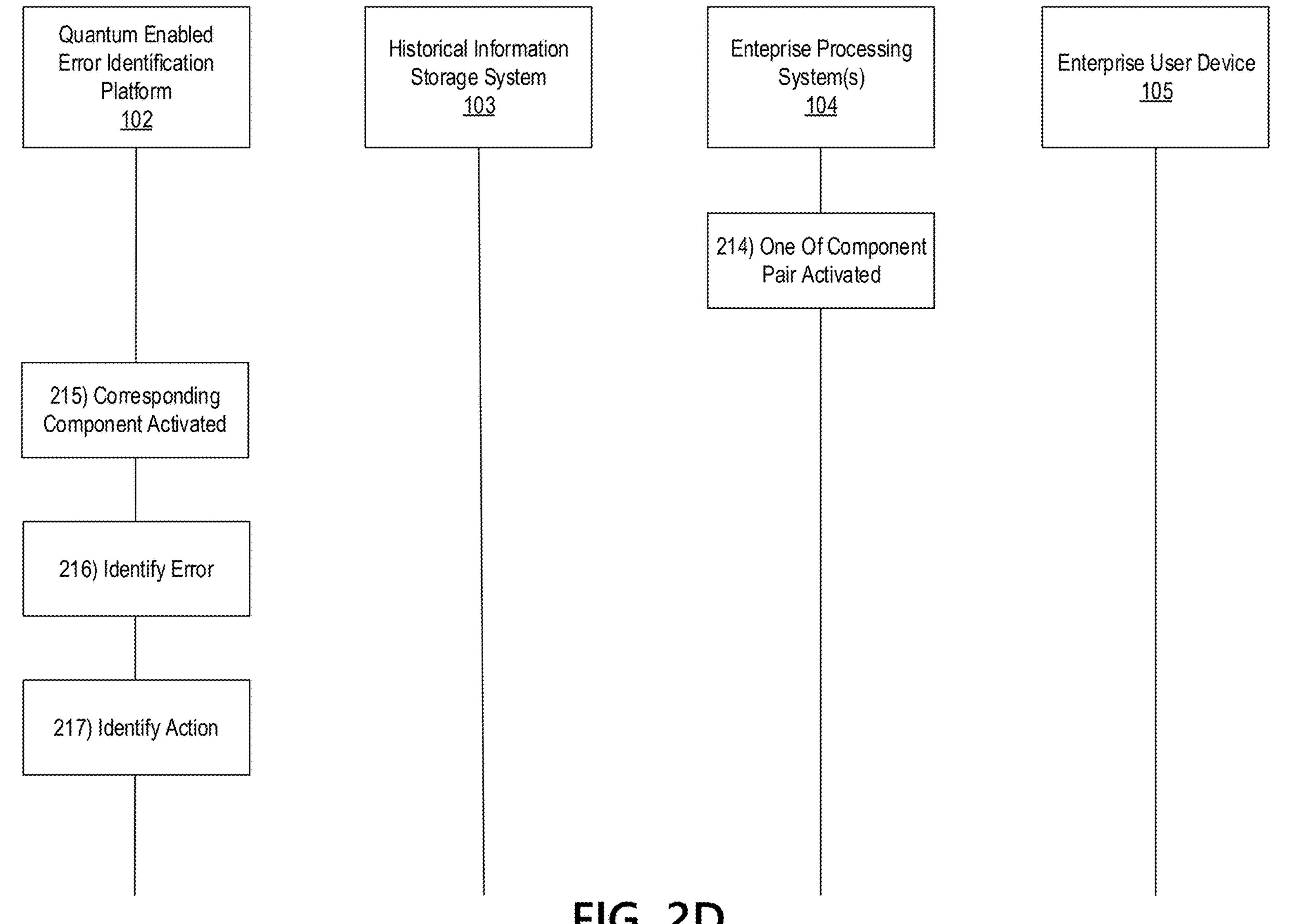

Referring to FIG. 2D, at step 214, the one of the pair of quantum enabled differential privacy components that was injected at step 211 may be activated based on the transaction failure that occurred in step 213. For example, if the transaction failure is caused by an application failure within enterprise processing system(s) 104, then the one of the pair of quantum enabled differential privacy components that corresponds to the respective dynamic marker (e.g., the application marker), may be activated. Then, the second of the pair of differential privacy components may also activate based on quantum entanglement, as discussed at step 215.

At step 215, the second of the pair of quantum enabled differential privacy components that was stored at quantum enabled error identification platform 102 may be activated based on the activation of the first of the pair of differential privacy components. For example, the activation may be based on the properties of quantum entanglement, in which an effect on the first of the pair of quantum enabled differential privacy component may affect the second of the pair of quantum enabled differential privacy component. This may realize the technical benefit of automatically knowing when transactions occur and where they occur without directly accessing enterprise processing system(s) 104.

At step 216, quantum enabled error identification platform 102 may identify an error that caused the transaction failure based on the activations that occurred at steps 214 and 215. For example, because the pair of the quantum enabled differential privacy components that were activated in steps 214 and 215 correspond to a particular dynamic marker (e.g., such as an application marker), then quantum error identification platform 192 may identify the cause of the error based on that particular dynamic marker. In some instances, if an error happens to not correspond to any dynamic marker, then a new dynamic marker may be created by, for example, enterprise user device 105 via a manual process, or automatically using AI engine 112*d*.

At step 217, quantum enabled error identification platform 102 may identify an action to execute based on the error that was identified at step 216. For example, quantum error identification platform 102 may use AI engine 112*d* to correlate the error that was identified at step 216 to an action to resolve the error based on the training that was performed at step 204.

For example, if the error was an application failure, the action may be performing an application update by quantum enabled error identification platform 102 to send commands, that when received by enterprise processing system(s) 104, may direct enterprise processing system(s) 104 to execute the application update. In some instances, additional actions may be alerting a software team about a software bug, alerting a hardware vendor associated with a hardware issue, rebooting a network associated with a network failure, alerting a security team about a security failure, etc.

Figure 2E:
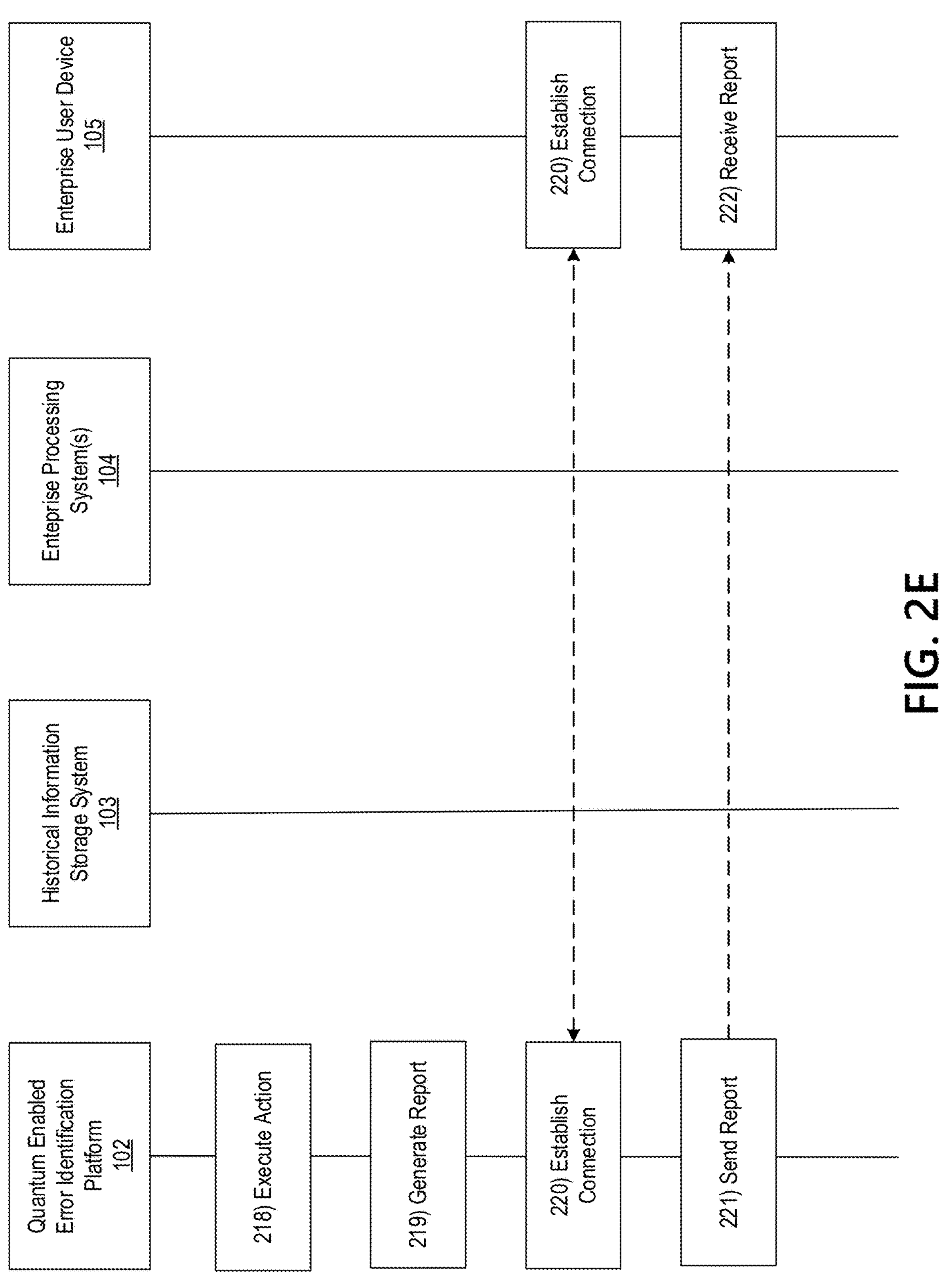

Referring to FIG. 2E, at step 218, quantum enabled error identification platform 102 may execute the action that was identified at step 217. For example, if the error was an application failure, the action may be performing an application update by quantum enabled error identification platform 102 to send commands, that when received by enterprise processing system(s) 104, may direct enterprise processing system(s) 104 to execute the application update. In some instances, additional actions may be alerting a software team about a software bug, alerting a hardware vendor associated with a hardware issue, rebooting a network associated with a network failure, alerting a security team about a security failure, etc.

Figure 4:
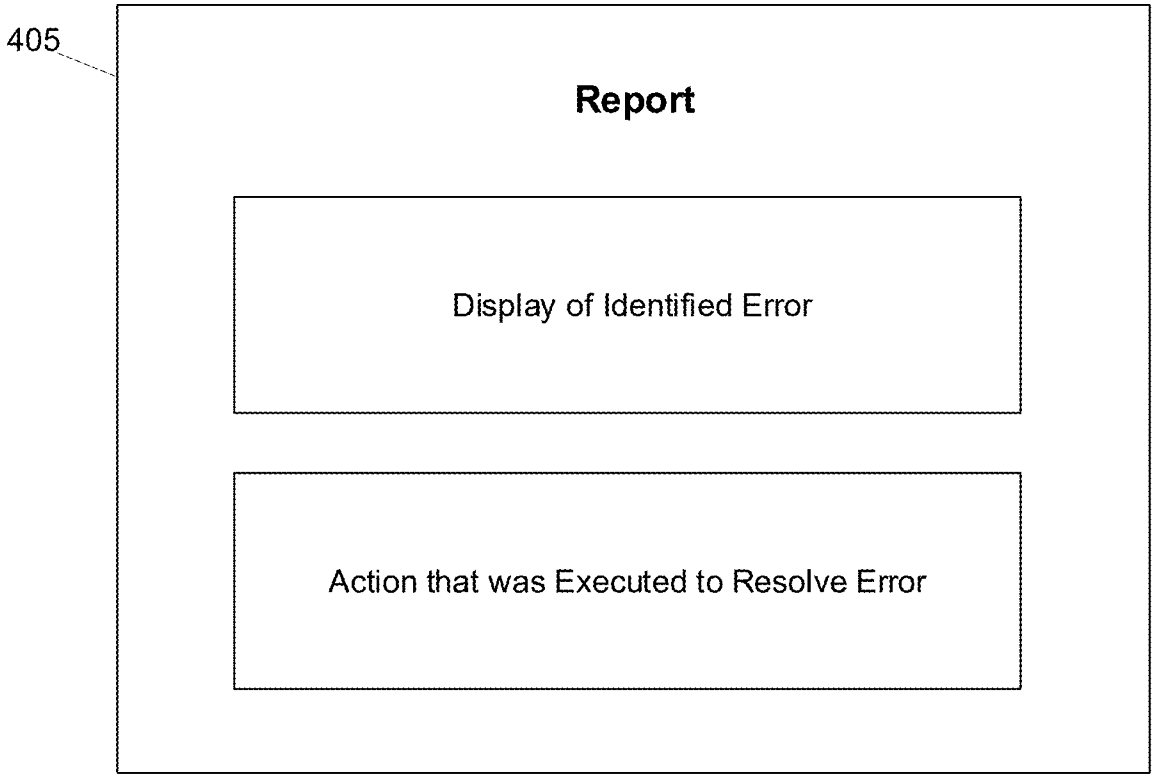
FIG. 4 depicts an illustrative graphical user interface for implementing an intelligent method for quantum enabled error identification in accordance with one or more aspects described herein.

At step 219, quantum enabled error identification platform 102 may generate a report. For example, the report may include information related to an error that was identified based on the dynamic marker being highlighted, and an action that was executed to resolve the error, and/or other similar information. In some instances, the report may look similar to the display 405 of FIG. 4, which may include information related to an error that was identified based on the dynamic marker being highlighted, and an action that was executed to resolve the error, and/or other similar information.

At step 220, quantum enabled error identification platform 102 may establish a connection with enterprise user device 105. For example, quantum enabled error identification platform 102 may establish a third wireless data connection with enterprise user device 105 to link quantum enabled error identification platform 102 to enterprise user device 105 (e.g., in preparation for sending the report, and/or performing other functions). In some instances, quantum enabled error identification platform 102 may identify whether or not a connection is established with enterprise user device 105. If a connection is already established with enterprise user device 105, quantum enabled error identification platform 102 might not re-establish the connection. If a connection is not yet established with enterprise user device 105, quantum enabled error identification platform 102 may establish the third wireless data connection as described herein.

At step 221, quantum enabled error identification platform 102 may send the report to enterprise user device 105. For example, quantum enabled error identification platform 102 may send the report to enterprise user device 105 using the third wireless data connection and via communication interface 113.

At step 222, enterprise user device 105 may receive the report. In some instances, enterprise user device 105 may receive the report while the third wireless data connection is established. For example, the report may be similar to the display 405 shown in FIG. 4, which may include information related to an error that was identified based on the dynamic marker being highlighted, and an action that was executed to resolve the error, and/or other similar information.

Figure 2F:
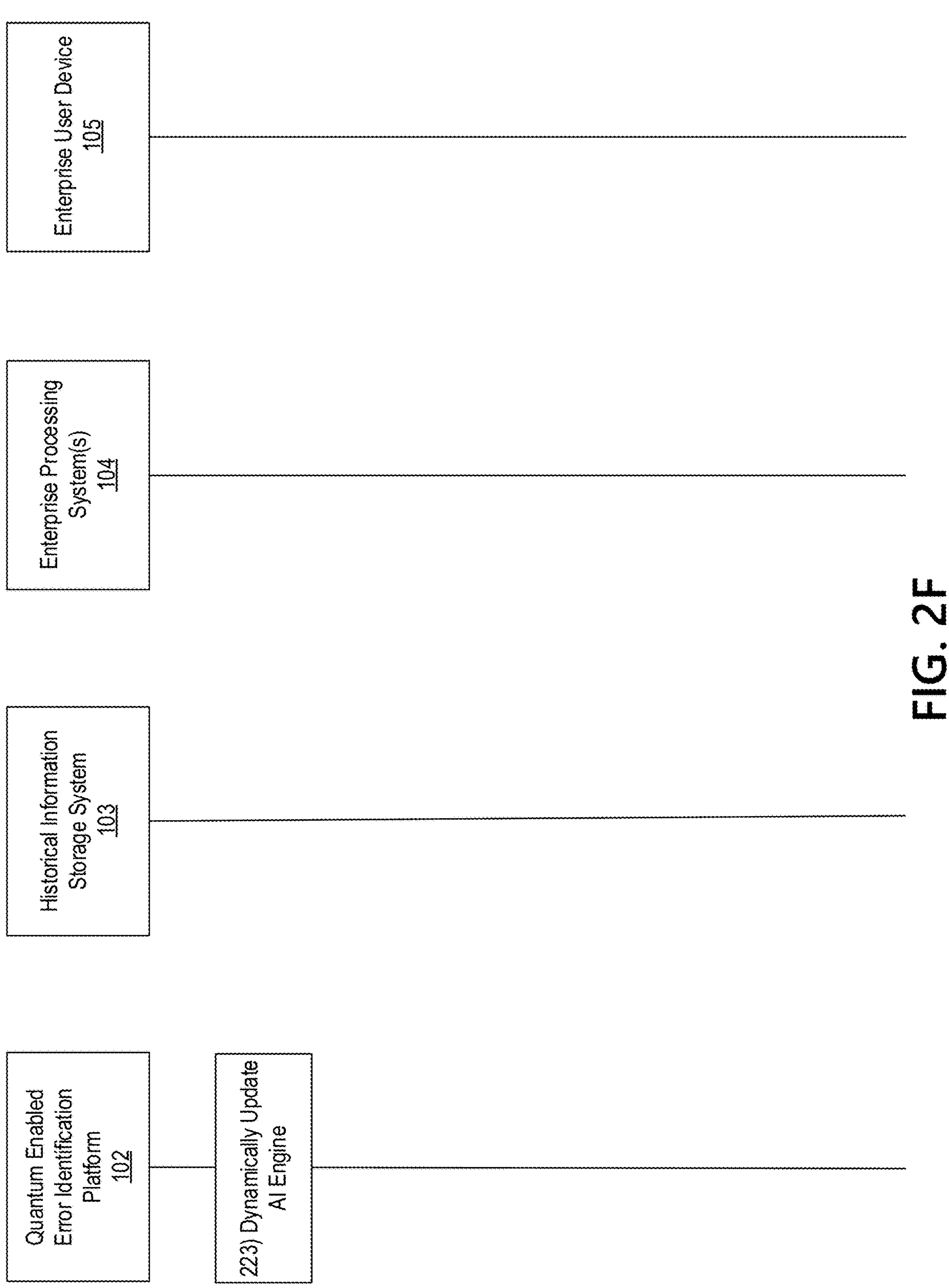

Referring to FIG. 2F, at step 223, quantum enabled error identification platform 102 may dynamically update the AI engine. For example the AI engine may be updated based on the outputs of steps 206-218, and/or feedback received from historical information storage system 103, enterprise processing system(s), and/or enterprise user device 105. In doing so, quantum enabled error identification platform 102 may create a feedback loop that dynamically and continuously updates and/or otherwise refines the AI engine so as to increase accuracy of the AI engine over time.

Figure 3:
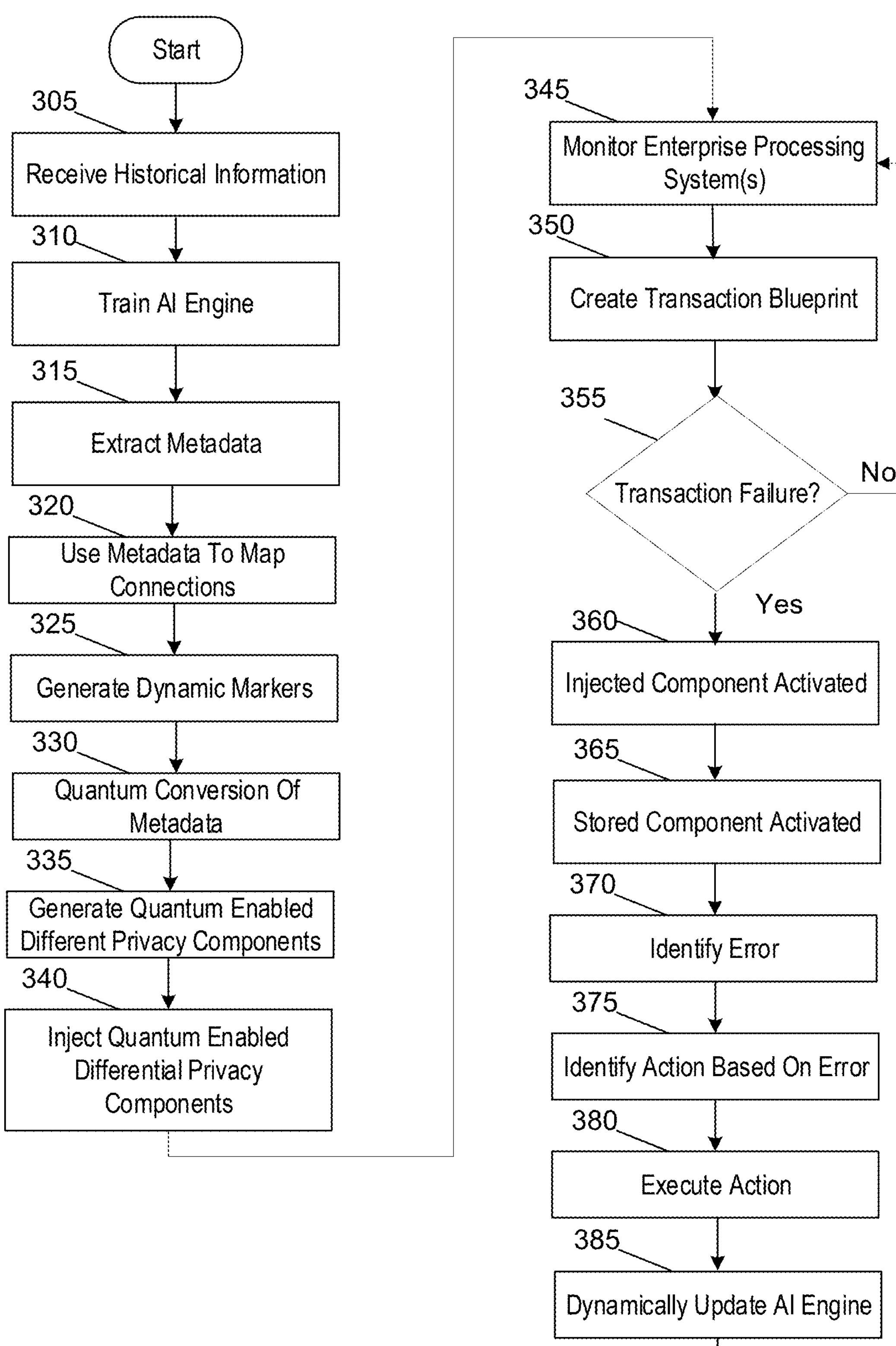
FIG. 3 depicts an illustrative method for implementing an intelligent method for quantum enabled error identification in accordance with one or more aspects described herein.

FIG. 3 depicts an illustrative method for implementing an intelligent method for quantum enabled error identification in accordance with one or more aspects described herein. At step 305, a computing platform having at least one processor, a communication interface, and memory may receive historical information. At step 310, the computing platform may train an artificial intelligence (AI) engine.

At step 315, the computing platform may extract metadata from one or more interconnected systems (e.g., enterprise processing system(s) 104). At step 320, the computing platform may use the metadata that was extracted at step 315 to map connections between enterprise processing system(s) 104.

At step 325, the computing platform may generate one or more dynamic markers. At step 330, the computing platform may perform a quantum conversion of the metadata that was extracted at step 320. At step 335, the computing platform may generate a pair of quantum enabled differential privacy components corresponding to a dynamic marker.

At step 340, the computing platform may inject one of the pair of quantum enabled differential privacy components into enterprise processing system(s) 104. At step 345, the computing platform may monitor enterprise processing system(s) 104. At step 350, the computing platform may create a blueprint of transactions that are processed within enterprise processing system(s) 104.

At step 355, the computing platform may determine whether a transaction failure has occurred. If a transaction failure has not occurred, then the computing platform may proceed to step 345. If a transaction failure has occurred, then the computing platform may proceed to step 360.

At step 360, the injected quantum enabled differential privacy component may be activated. At step 365, the stored quantum enabled differential privacy component that corresponds to the injected quantum enabled differential privacy component may be activated.

At step 370, the computing platform may identify an error based on the quantum enabled differential privacy components that were activated at step 360 and step 365 (which both may correspond to a particular dynamic marker). At step 375, the computing platform may identify an action base on the error that was identified at step 370 using the trained AI engine.

At step 380, the computing platform may execute the action that was identified at step 375. At step 385, the computing platform may dynamically update the AI engine.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

train, based on historical information, an artificial intelligence (AI) engine, wherein training the AI engine configures the AI engine to identify an action to resolve an error;

extract metadata from one or more interconnected enterprise processing systems;

use the metadata to map the one or more interconnected enterprise processing systems, wherein the mapping identifies one or more connections within the one or more interconnected enterprise processing systems between one or more of:

the one or more interconnected enterprise processing systems; or applications within the one or more interconnected enterprise processing systems;

generate one or more dynamic markers;

create, using a quantum noise inducer and via laplace transformation, a pair of differential privacy components for each of the one or more dynamic markers, wherein each differential privacy component of the pair of differential privacy components is related to the other differential privacy component of the pair of differential privacy components via quantum entanglement such that an effect on one differential privacy component of the pair of differential privacy components impacts the other differential privacy component of the pair of differential privacy components;

store a first of the pair of differential privacy components at the computing platform;

inject a second of the pair of differential privacy components into the metadata of the one or more interconnected enterprise processing systems, wherein injecting the second of the pair of differential privacy components into the metadata causes the second of the pair of differential privacy components to appear as noise within the metadata;

detect that a dynamic marker has been activated, wherein the dynamic marker is activated by:

activating, at one of the one or more interconnected enterprise processing systems, the second of the pair of differential privacy components that corresponds to the dynamic marker;

activating, at the computing platform and based on the activating of the second of the pair of differential privacy components, the first of the pair of differential privacy components, wherein the first of the pair of differential privacy components and the second of the pair of differential privacy components correspond to the dynamic marker that was activated, and wherein the activating of the first of the pair of differential privacy components is based on the activating of the second of the pair of differential privacy components and the quantum entanglement of the pair of differential privacy components;

identify an error that corresponds to the dynamic marker that was activated;

identify an action based on the error using the AI engine; and execute the action by sending commands to the one or more interconnected processing systems, that when received by the one or more interconnected processing systems, directs one of the one or more interconnected processing systems to execute the action.

2. The computing platform of claim 1, wherein the memory stores additional computer-readable instructions that, when executed by the at least one processor, cause the computing platform to:

generate a report, wherein the report comprises the error that corresponds to the dynamic marker that was activated, and the action that was executed.

3. The computing platform of claim 2, wherein the memory stores additional computer-readable instructions that, when executed by the at least one processor, cause the computing platform to:

send, to an enterprise user device, the report and one or more commands directing the enterprise user device to display the report, wherein sending the one or more commands directing the enterprise user device to display the report causes the enterprise user device to display the report.

4. The computing platform of claim 1, wherein the memory stores computer-readable instructions that, when executed by the at least one processor, further cause the computing platform to:

create one or more blueprints, wherein each of the one or more blueprints corresponds to one or more transactions within the one or more interconnected enterprise processing systems.

5. The computing platform of claim 1, wherein the historical information further comprises:

historical errors, historical actions that resolved corresponding historical errors, historical dynamic markers, and historical transactions.

6. The computing platform of claim 1, wherein the one or more dynamic markers comprise one or more of:

a transaction marker, an application marker, a system marker, a network marker, a hardware marker, or a software marker.

7. The computing platform of claim 1, wherein the creating is performed using differential privacy.

8. The computing platform of claim 1, wherein the memory stores computer-readable instructions that, when executed by the at least one processor, further cause the computing platform to:

update, using a dynamic feedback loop and based on the detecting, the identifying, and the executing, the AI engine.

9. The computing platform of claim 1, wherein the identifying the error that corresponds to the dynamic marker that was activated comprises automatically identifying the error using the AI engine.

10. A method comprising:

at a computing platform comprising at least one processor, a communication interface, and memory:

training, based on historical information, an artificial intelligence (AI) engine, wherein training the AI engine configures the AI engine to identify an action to resolve an error;

extracting metadata from one or more interconnected enterprise processing systems;

using the metadata to map the one or more interconnected enterprise processing systems, wherein the mapping identifies one or more connections within the one or more interconnected enterprise processing systems between one or more of:

the one or more interconnected enterprise processing systems; or applications within the one or more interconnected enterprise processing systems;

generating one or more dynamic markers;

creating, using a quantum noise inducer and via laplace transformation, a pair of differential privacy components for each of the one or more dynamic markers, wherein each differential privacy component of the pair of differential privacy components is related to the other differential privacy component of the pair of differential privacy components via quantum entanglement such that an effect on one differential privacy component of the pair of differential privacy components impacts the other differential privacy component of the pair of differential privacy components;

storing a first of the pair of differential privacy components at the computing platform;

injecting a second of the pair of differential privacy components into the metadata of the one or more interconnected enterprise processing systems, wherein injecting the second of the pair of differential privacy components into the metadata causes the second of the pair of differential privacy components to appear as noise within the metadata;

detecting that a dynamic marker has been activated, wherein the dynamic marker is activated by:

activating, at one of the one or more interconnected enterprise processing systems, the second of the pair of differential privacy components that corresponds to the dynamic marker;

activating, at the computing platform and based on the activating of the second of the pair of differential privacy components, the first of the pair of differential privacy components, wherein the first of the pair of differential privacy components and the second of the pair of differential privacy components correspond to the dynamic marker that was activated, and wherein the activating of the first of the pair of differential privacy components is based on the activating of the second of the pair of differential privacy components;

identifying an error that corresponds to the dynamic marker that was activated;

identifying an action based on the error using the AI engine; and executing the action by sending commands to the one or more interconnected processing systems, that when received by the one or more interconnected processing systems, directs one of the one or more interconnected processing systems to execute the action.

11. The method of claim 10, further comprising:

generating a report, wherein the report comprises the error that corresponds to the dynamic marker that was activated, and the action that was executed.

12. The method of claim 11, further comprising:

sending, to an enterprise user device, the report and one or more commands directing the enterprise user device to display the report, wherein sending the one or more commands directing the enterprise user device to display the report causes the enterprise user device to display the report.

13. The method of claim 10, further comprising:

creating one or more blueprints, wherein each of the one or more blueprints corresponds to one or more transactions within the one or more interconnected enterprise processing systems.

14. The method of claim 10, wherein the historical information further comprises:

historical errors, historical actions that resolved corresponding historical errors, historical dynamic markers, and historical transactions.

15. The method of claim 10, wherein the one or more dynamic markers comprise one or more of:

a transaction marker, an application marker, a system marker, a network marker, a hardware marker, or a software marker.

16. The method of claim 10, wherein the creating is performed using differential privacy.

17. The method of claim 10, further comprising:

updating, using a dynamic feedback loop and based on the detecting, the identifying, and the executing, the AI engine.

18. The method of claim 10, wherein the identifying the error that corresponds to the dynamic marker that was activated comprises automatically identifying the error using the AI engine.

19. One or more non-transitory computer-readable media storing instructions that, when executed by a computing platform comprising at least one processor, a communication interface, and memory, cause the computing platform to:

train, based on historical information, an artificial intelligence (AI) engine, wherein training the AI engine configures the AI engine to identify an action to resolve an error;

extract metadata from one or more interconnected enterprise processing systems;

use the metadata to map the one or more interconnected enterprise processing systems, wherein the mapping identifies one or more connections within the one or more interconnected enterprise processing systems between one or more of:

the one or more interconnected enterprise processing systems; or applications within the one or more interconnected enterprise processing systems;

generate one or more dynamic markers;

create, using a quantum noise inducer and via laplace transformation, a pair of differential privacy components for each of the one or more dynamic markers, wherein each differential privacy component of the pair of differential privacy components is related to the other differential privacy component of the pair of differential privacy components via quantum entanglement such that an effect on one differential privacy component of the pair of differential privacy components impacts the other differential privacy component of the pair of differential privacy components;

store a first of the pair of differential privacy components at the computing platform;

inject a second of the pair of differential privacy components into the metadata of the one or more interconnected enterprise processing systems, wherein injecting the second of the pair of differential privacy components into the metadata causes the second of the pair of differential privacy components to appear as noise within the metadata;

detect that a dynamic marker has been activated, wherein the dynamic marker is activated by:

activating, at one of the one or more interconnected enterprise processing systems, the second of the pair of differential privacy components that corresponds to the dynamic marker;

activating, at the computing platform and based on the activating of the second of the pair of differential privacy components, the first of the pair of differential privacy components, wherein the first of the pair of differential privacy components and the second of the pair of differential privacy components correspond to the dynamic marker that was activated, and wherein the activating of the first of the pair of differential privacy components is based on the activating of the second of the pair of differential privacy components;

identify an error that corresponds to the dynamic marker that was activated;

identify an action based on the error using the AI engine; and execute the action by sending commands to the one or more interconnected processing systems, that when received by the one or more interconnected processing systems, directs one of the one or more interconnected processing systems to execute the action.

* * * * *